United States Patent
Shahbazi

(10) Patent No.: US 7,165,804 B2
(45) Date of Patent: Jan. 23, 2007

(54) METHODS FOR REDUCING THE AERODYNAMIC DRAG OF VEHICLES

(75) Inventor: Khosrow Shahbazi, 3964 Spinnaker Run Pointe, Little Elm, TX (US) 75068

(73) Assignee: Khosrow Shahbazi, Little Elm, TX (US)

( * ) Notice: Subject to any disclaimer, the term of this patent is extended or adjusted under 35 U.S.C. 154(b) by 0 days.

(21) Appl. No.: 11/277,902

(22) Filed: Mar. 29, 2006

(65) Prior Publication Data

US 2006/0170246 A1 Aug. 3, 2006

Related U.S. Application Data

(62) Division of application No. 10/883,389, filed on Jul. 1, 2004.

(51) Int. Cl.
*B60J 1/00* (2006.01)
(52) U.S. Cl. .................. 296/180.1; 296/180.4
(58) Field of Classification Search ............ 296/180.1, 296/180.4; 180/901
See application file for complete search history.

(56) References Cited

U.S. PATENT DOCUMENTS

| | | | | |
|---|---|---|---|---|
| 1,923,349 A | * | 8/1933 | Wolverton | 296/180.1 |
| 1,934,385 A | * | 11/1933 | Strauss | 180/89.1 |
| 2,037,942 A | * | 4/1936 | Stalker | 180/89.1 |
| 3,317,161 A | * | 5/1967 | Sawyer | 244/36 |
| 3,910,623 A | * | 10/1975 | McKeen | 296/180.1 |
| 4,284,302 A | | 8/1981 | Drews | |
| 4,384,630 A | * | 5/1983 | Steiner | 296/180.1 |
| 4,455,045 A | | 6/1984 | Wheeler | |
| 4,460,055 A | * | 7/1984 | Steiner | 296/180.1 |
| 4,502,724 A | | 3/1985 | Grenadier | |
| 4,511,170 A | | 4/1985 | Sankrithi | |
| 4,558,634 A | | 12/1985 | Oshiro et al. | |
| 4,601,508 A | * | 7/1986 | Kerian | 296/180.4 |
| 4,653,788 A | | 3/1987 | Di Giusto | |
| 4,673,206 A | | 6/1987 | Kretschmer et al. | |
| 4,678,118 A | | 7/1987 | Fukami et al. | |
| 4,889,382 A | | 12/1989 | Burst et al. | |
| 4,917,434 A | | 4/1990 | Sumitani | |
| 5,042,870 A | * | 8/1991 | Yura | 296/180.1 |
| 5,120,105 A | | 6/1992 | Brin et al. | |

(Continued)

FOREIGN PATENT DOCUMENTS

FR 2 613 682 A1 10/1988

(Continued)

*Primary Examiner*—Kiran B. Patel
(74) *Attorney, Agent, or Firm*—Schubert Osterrieder & Nickelson PLLC

(57) ABSTRACT

Systems, methods and media for reducing the aerodynamic drag of vehicles are disclosed. More particularly, a method for reducing the pressure drag of a vehicle is disclosed. Embodiments may include capturing air from the airflow around the vehicle when the vehicle is moving and directing air from a first location to a second location. Embodiments may also include forcing the captured air from the second location into a lower pressure region to reduce pressure drag associated with movement of the vehicle in a direction, where the lower pressure region is created in response to movement of the vehicle. Further embodiments may include where directing the air includes directing the air through a duct internal to the vehicle or through a duct attached to the vehicle.

9 Claims, 6 Drawing Sheets

U.S. PATENT DOCUMENTS

| | | | |
|---|---|---|---|
| 5,171,057 A * | 12/1992 | Sharp | 296/180.4 |
| 5,280,990 A * | 1/1994 | Rinard | 296/180.1 |
| 5,322,340 A | 6/1994 | Sato et al. | |
| 5,566,775 A | 10/1996 | Schoell | |
| 5,598,990 A | 2/1997 | Farokhi et al. | |
| 5,820,203 A | 10/1998 | Morelli et al. | |
| 5,908,217 A | 6/1999 | Englar | |
| 6,068,328 A | 5/2000 | Gazdzinski | |
| 6,230,836 B1 | 5/2001 | Cowan et al. | |
| 6,354,003 B1 * | 3/2002 | Lehmann et al. | 296/208 |
| 6,685,256 B1 * | 2/2004 | Shermer | 296/180.1 |
| 6,692,066 B2 * | 2/2004 | Fairburn et al. | 296/180.1 |
| 6,742,616 B2 * | 6/2004 | Leban | 296/180.4 |
| 6,779,834 B1 * | 8/2004 | Keller | 296/180.4 |
| 6,786,291 B1 * | 9/2004 | Linden et al. | 296/180.1 |
| 2002/0021023 A1 | 2/2002 | Leban | |
| 2002/0153178 A1 * | 10/2002 | Limonius | 180/2.2 |

FOREIGN PATENT DOCUMENTS

| | | |
|---|---|---|
| FR | 2 700 993 A1 | 8/1994 |
| GB | 243755 | 9/1926 |

* cited by examiner

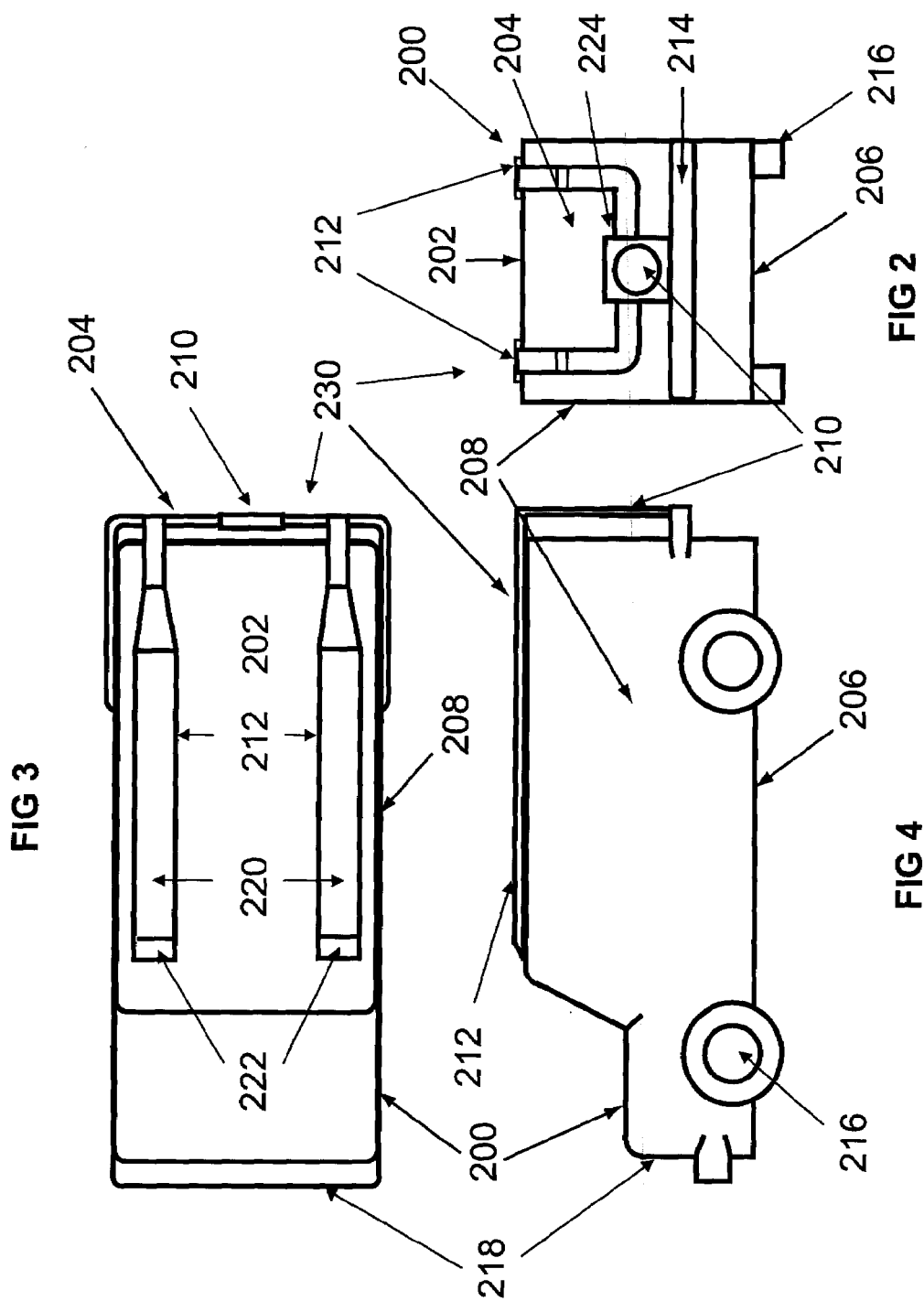

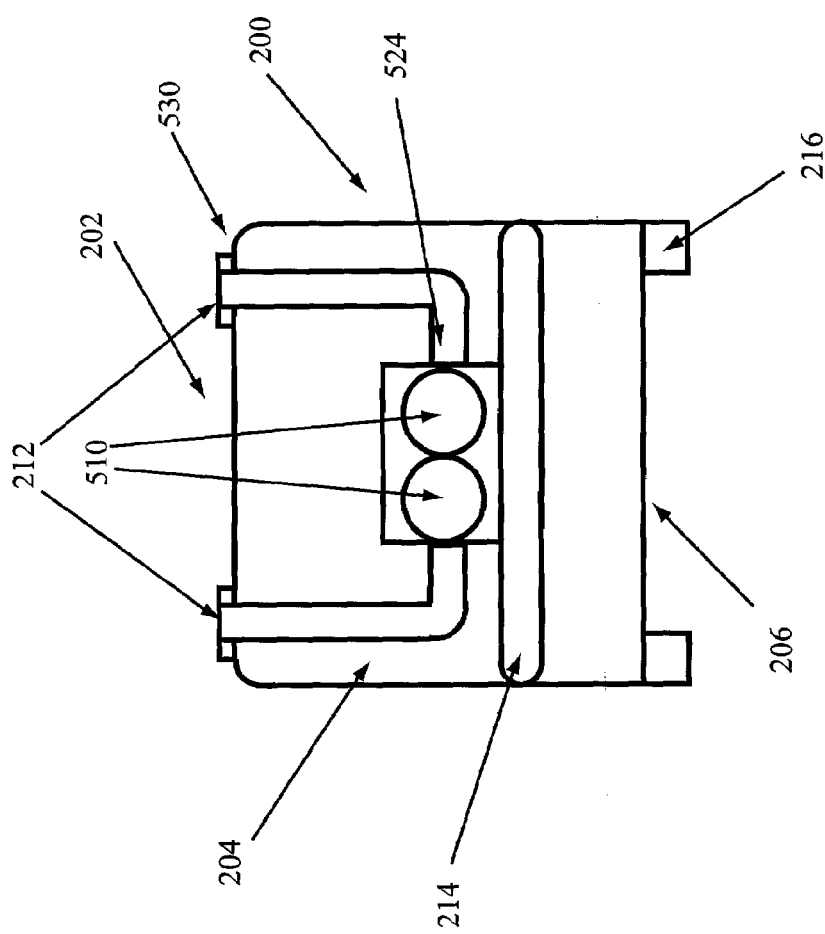

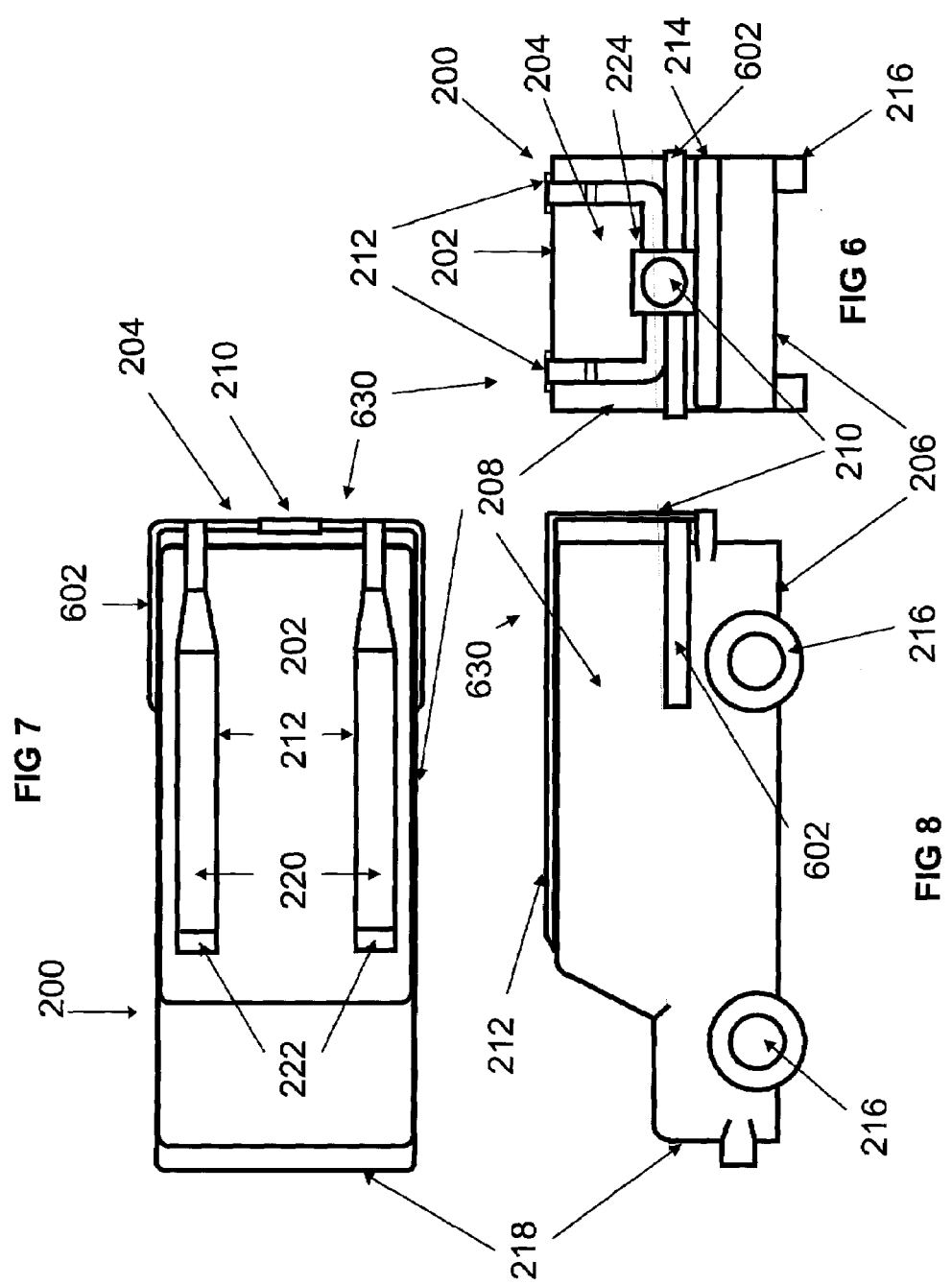

METHODS FOR REDUCING THE AERODYNAMIC DRAG OF VEHICLES

CROSS-REFERENCE TO RELATED APPLICATION

Pursuant to 35 USC § 121, this divisional application claims priority to and benefit of U.S. Utility patent application Ser. No. 10/883,389, filed Jul. 1, 2004, on behalf of inventor Khosrow Shahbazi, entitled "SYSTEMS, METHODS, AND MEDIA FOR REDUCING THE AERODYNAMIC DRAG OF VEHICLES."

FIELD OF INVENTION

The present invention is in the field of vehicles and, in particular, methods for reducing the aerodynamic drag and/or improving the fuel efficiency of a vehicle. More particularly, the present invention relates to methods for reducing the aerodynamic drag of a vehicle in motion by reducing the pressure drag associated with the vehicle.

BACKGROUND

A significant portion of the operational costs of a modern motor vehicle arises from the consumption of fuel. Motor vehicles with internal combustion engines typically burn fossil fuels such as gasoline. Gasoline and other fossil fuels are relatively inexpensive at the present time in the United States as compared to the prices in other countries, but the prices are subject to fluctuations and the potential of future increases in the event of political instability in oil-producing regions, increased taxes by governmental entities, or shortages of oil. Fuel can be very expensive for commuters, vacationers, cross-country truckers, or anyone driving a fossil fuel-powered vehicle. Increased fuel prices can also have a significant detrimental impact on the economy, as they can deter travel, increase the cost of transportation or manufacture of goods, etc. The relative usage of fuel by a motor vehicle is known as fuel efficiency, and is also known as fuel economy or gas mileage.

Motor vehicles, such as automobiles, sports utility vehicles (SUVs), vans, and trucks, require a propulsive force in order to move the vehicle. This propulsive force must overcome the drag of the vehicle in order for the vehicle to move forward. Drag on a vehicle originates from a number of sources, including aerodynamic drag and tire drag (resulting from frictional forces caused by the tire-road interaction). Propulsive force is typically generated by some sort of engine, such as internal combustion engine, fuel cell, electrical engine, etc.

Aerodynamic drag includes both frictional drag and pressure drag. Frictional drag derives from friction between the fluid (air) and the surfaces of the vehicle over which it is flowing. The velocity of the air moving over the surfaces of the vehicle is known as the free stream velocity. The free stream velocity is based on the speed of the vehicle and the prevailing wind. For example, if a vehicle had a speed of 60 miles per hour ("MPH") and was heading directly into a 15 MPH headwind, the free stream velocity would be 75 MPH. Because of the air moving over the surfaces of the vehicle, a boundary layer is typically formed along the surface of the vehicle, serving as a transition between air at zero velocity right at the surface and air at the free stream velocity at the edge of the boundary layer. The boundary layer may contain both laminar (smooth) flow and turbulent flow. Often, near the rear of a vehicle, the flow "separates", meaning that the boundary layer separates from the surface, resulting in eddies and fully turbulent flow. The drag caused by the air in the boundary layer creates frictional drag.

Pressure drag (also known as form drag) results from the difference in pressure between the front of the vehicle and the rear of the vehicle. Accordingly, it depends on the size and shape of the vehicle. When the airflow separates on the vehicle, as described above, lower pressures are created behind the vehicle than would exist in the absence of separation, resulting in increased pressure drag. This problem is exacerbated on less aerodynamic vehicles, such as SUV's and trucks, as their relatively blocky shapes cause additional separation and thus additional pressure drag. The pressure behind a vehicle may drop low enough, particularly when moving at high speeds, to create vacuum-like conditions behind the vehicle, resulting in very high pressure drag.

Aerodynamic drag is directly proportional to the coefficient of drag, frontal area of the motor vehicle, and the square of the velocity of the motor vehicle. The coefficient of drag, also known as the drag coefficient, (Cd), is a number that describes the characteristic amount of aerodynamic drag caused by fluid flow for a particular shape, such as a vehicle. The Cd includes the effects of drag caused by pressure drag, frictional drag, and induced drag (drag caused by positive or negative lift). Lower Cd's result in lower drag and thus improved fuel efficiency. A typical modern automobile has a Cd of between 0.30 and 0.35. SUVs and other larger, boxier automobiles, have Cd's of about 0.35 to 0.45. Tractor-trailer combinations can have Cd's of 0.6–0.9. For modern motor vehicles, the majority of the Cd is now based on pressure drag, as both frictional drag and induced drag have been greatly reduced by utilizing various technical advances. Reduction of pressure drag can therefore have a significant impact on the Cd and, thus, the fuel efficiency of a vehicle.

Vehicle pressure drag results from separation of the airflow around the vehicle and the resultant wake or separation bubble formed on the backside of the vehicle. Typically, when an airflow moves around the top, bottom, or side of a vehicle, the airflow will transition from a attached flow (often smooth and laminar) to a separated flow when boundary layer separation occurs. A vehicle with an optimized rear end, such as a sports car with a tapered rear, will allow for the boundary layer to stay attached for as long as possible, minimizing the separated flow behind the vehicle (and reducing pressure drag). A vehicle such as an SUV with a squarish design and flat rear end will have significantly increased separated flow behind it, as the boundary layers and thus airflows will separate near the rear of the vehicle, causing a larger region of low pressure. Depending on the particular design and conditions (e.g., vehicle speed, Cd, etc.), this lower pressure region can be close to a vacuum and extend a relatively large distance behind the vehicle.

In response to pressure from consumers and mandates from governmental entities (such as the Corporate Average Fuel Economy, or CAFE, standards in the United States), motor vehicle manufacturers have attempted to reduce the Cd and improve the fuel efficiency of their vehicles through a variety of technical solutions. While manufacturers have been somewhat successful in improving fuel efficiency, further reductions utilizing these technical solutions are likely to have significant aesthetic, cost, or performance disadvantages. For example, vehicle manufacturers have created aerodynamic shapes that have reduced drag significantly. Reducing the drag substantially further, however, will result in reduction of useful interior space, particularly in the rear of the vehicle. This downside is even more significant in trucks, vans, or SUVs where cargo capacity is a major selling point.

As another example, reduction of vehicle weight does reduce the tire drag of a vehicle (and thus improves the efficiency), but vehicles have been getting heavier over time as a result of increased safety functionality and other features. Reductions in weight would require elimination of features or more expensive, lighter materials, neither of which is desirable to either manufacturers or consumers.

SUMMARY OF THE INVENTION

The problems identified above are in large part addressed by a method and apparatus for the aerodynamic drag and/or improving the fuel efficiency of a vehicle by reducing the pressure drag created by the vehicle. One embodiment provides a fan attached to a vehicle, wherein the fan is positioned to direct air towards the lower pressure region created behind the vehicle when the vehicle is moving forward. Air directed into the lower pressure region raises the pressure in the lower pressure region, lowering the pressure drag partially created by the lower pressure region.

In one embodiment, a duct is adapted to be attached to the vehicle and to direct air to the fan. The duct may be located on an outer surface of the vehicle body, may be integral to the body, or a combination thereof. In an alternative embodiment, multiple fans and/or multiple ducts may also be used.

In another alternative embodiment, a pressure sensor is provided and positioned so as to provide an indication of the pressure in the lower pressure region. A controller may also be provided to alter an output characteristic of the fan based at least partially on the indicated pressure.

In another alternative embodiment, a method for reducing the pressure drag is provided. The method generally involves driving a vehicle at a speed high enough to create a lower pressure region behind the vehicle and directing air from one part of the vehicle to the lower pressure region.

In a further embodiment, a vehicle with a chassis and body is provided, where the vehicle includes an internal duct. The internal duct may be in communication with a fan, which is positioned to direct air towards the lower pressure region.

In another embodiment, a method for reducing the pressure drag of a vehicle is provided. The method generally involves capturing air from the airflow around the vehicle, directing air from a first location to a second location, and forcing the captured air from the second location into a lower pressure region created in response to movement of the vehicle in a direction.

In another embodiment, a machine-accessible medium containing instructions to cause a machine to perform operations. The instructions generally involve receiving input relating to a vehicle, determining an improved pressure drag reduction system configuration at least partially based on the input, and changing the configuration of the system based on the determined improved configuration.

BRIEF DESCRIPTION OF THE DRAWINGS

Other objects and advantages of the invention will become apparent upon reading the following detailed description and upon reference to the accompanying drawings in which like references may indicate similar elements:

FIG. 2 depicts a rear view of a motor vehicle equipped with a fan and ducts according to one embodiment;

FIG. 3 depicts a top view of the vehicle of FIG. 2;

FIG. 4 depicts a side view of the vehicle of FIG. 2;

FIG. 5 depicts a rear view of a vehicle equipped with fans and ducts according to an alternative embodiment;

FIG. 6 depicts a rear view of a vehicle equipped with a fan, side ducts and top ducts according to an alternative embodiment;

FIG. 7 depicts a top view of the vehicle of FIG. 6;

FIG. 8 depicts a side view of the vehicle of FIG. 6;

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, a method and apparatus for reducing the aerodynamic drag of a vehicle is disclosed. More particularly, a method and apparatus is disclosed for increasing the pressure of air behind the vehicle so as to reduce pressure drag. One embodiment provides one or more fans attached to a vehicle, wherein at least one fan is positioned to direct air towards the lower pressure region created behind the vehicle when the vehicle is moving forward. Air directed into the lower pressure region raises the pressure in the lower pressure region, lowering the pressure drag partially created by the lower pressure region. In one embodiment, one or more ducts are adapted to be attached to the vehicle and to direct air to the at least one fan.

Figure 1:
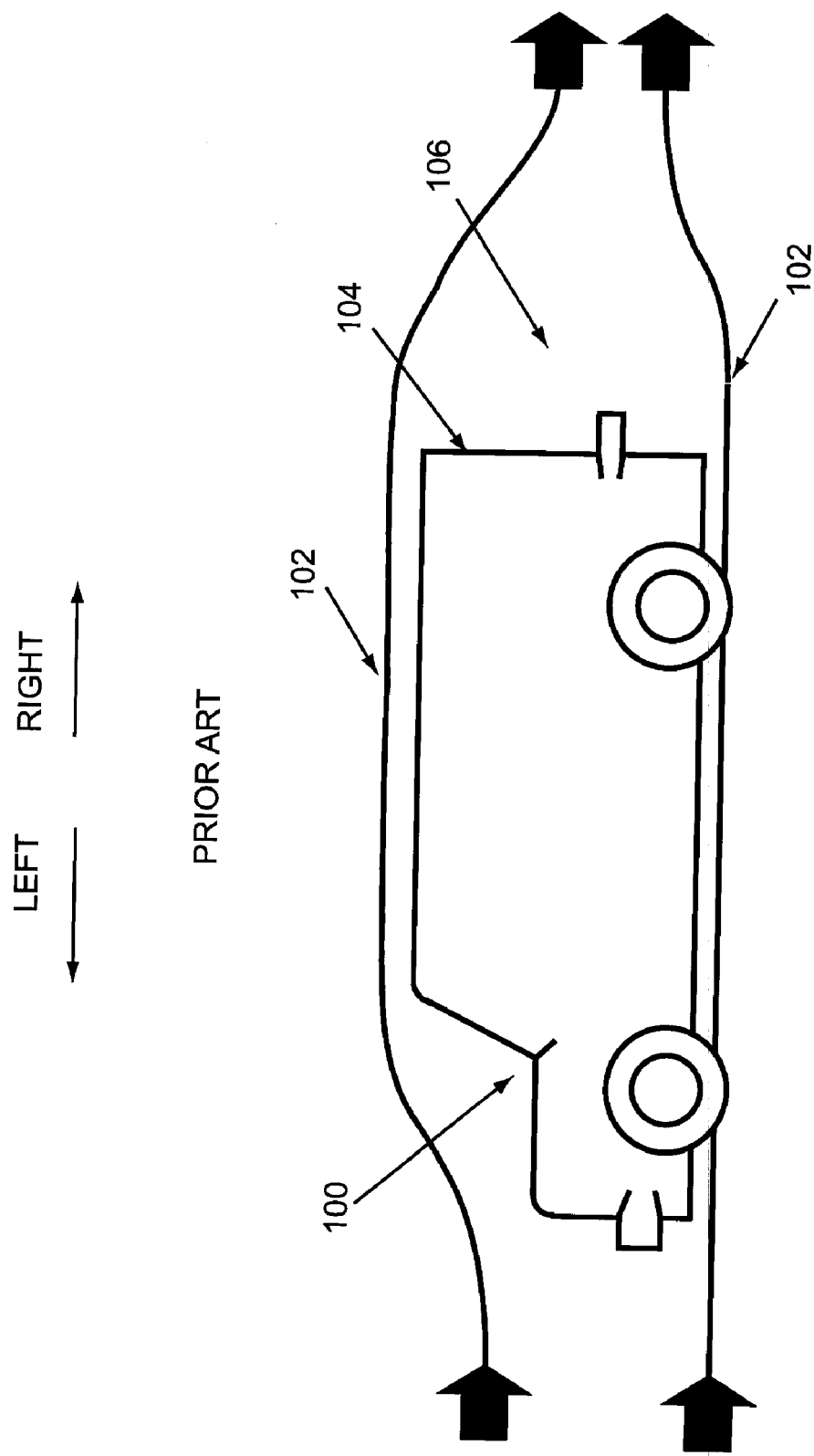
FIG. 1 depicts a side view of a prior art motor vehicle subjected to an airflow.

Turning now to the drawings, FIG. 1 depicts a prior art motor vehicle 100 subjected to an airflow, such as is created when moving forward. Motor vehicle 100 is shown moving left in FIG. 1, with rear surface 104 being located at the rear of the motor vehicle 100. When the motor vehicle 100 is moving forward, air flows along the outer surface of the motor vehicle (from left to right on the page and as shown by the arrows), as depicted by the air streams 102 in FIG. 1. The air streams 102 begin as parallel streams in front of the vehicle 100, progress and bend along the surface, and usually separate from the surface near the rear of the vehicle 100. For motor vehicle 100 of FIG. 1, the air streams 102 separate approximately near the top of the rear surface 104 and become roughly parallel again well behind the vehicle. A lower pressure region 106 is created between the rear surface 104 and the separated air streams 102 and is generally located behind the vehicle 100. The pressure in the lower pressure region 106 is lower than the pressure near the front of the motor vehicle 100, resulting in a net drag force on the vehicle 100. This pressure drag ultimately results in lower fuel efficiency and increased fuel consumption for a motor vehicle 100.

The effect of pressure drag is magnified in vehicles that have poor aerodynamic shapes, such as SUVs, vans, trucks, pick-up trucks, etc. A rear surface 104 that is generally perpendicular to the ground is usually indicative of a poor aerodynamic shape, especially when compared to sports cars or other vehicles with relatively tapered rear ends. For these vehicles with poor aerodynamic shapes, the lower pressure region 106 has a lower pressure (closer to a true vacuum) than in smaller, more aerodynamic vehicles, resulting in a larger pressure (and force) differential—and thus more drag.

The size of the lower pressure region 106 and its actual pressure (i.e., how close it is to a vacuum) depend on many factors. Besides vehicle 100 shape, the lower pressure region 106 will enlarge, and the pressure will go down, as vehicle 100 speed increases. Other variables, such as air pressure, wind speed and direction, weather, etc. will also impact the physical configuration of the lower pressure region 106.

FIGS. 2–4 depict a rear view, a top view, and a side view, respectively, of a motor vehicle equipped with a fan and ducts according to one embodiment. Vehicle 200 has a body with a top surface 202, rear surface 204, bottom surface 206, side surfaces 208, and a front surface 218. Vehicle 200 typically has a chassis (not shown) with a plurality of wheels 216 rotatably attached to the chassis so as to facilitate movement. An optional rear bumper 214 may be included to provide protection in the event of an accident or for aesthetic purposes.

Vehicle 200 includes a pressure drag reduction system 230, which includes a fan 210 and one or more air ducts 212 in the embodiment depicted in FIG. 2. In one embodiment, the fan 210 is used to direct air into the lower pressure region 106 that is formed behind a vehicle 200 when in motion. Air ducts 212 may optionally provide additional airflow for the fan 210. The air from the fan 210 enters the lower pressure region 106 and spreads out, serving to attenuate or eliminate the lower pressure region 106. Attenuation of the size or difference in pressure associated with the lower pressure region 106 will reduce the pressure drag of the vehicle, thus reducing the Cd and increasing fuel efficiency.

Vehicle 200 may be any type of vehicle, such as automobile, truck, SUV, tractor-trailer rig, boat, aircraft, hydrofoil, train, etc. Vehicle 200 may be propelled by any sort of engine, such as an internal combustion engine, natural gas powered vehicle, fuel cell powered vehicle, solar-powered vehicle, etc., or a vehicle without propulsion, such as a glider. The pressure drag reduction system 230 is suitable for any shape of the vehicle 200 that incurs any amount of pressure drag when moving through a fluid such as air or water. The pressure drag reduction system 230 may also be designed to reduce pressure drag created from any anticipated direction of movement of the vehicle 200.

In one embodiment, the fan 210 includes a fan blade rotatably mounted on a fan body. Air enters the fan 210 through an optional fan inlet and is then propelled by the fan blade through a fan outlet. The optional fan inlet directs air towards the fan blade while the fan outlet, which is also optional, directs the airflow from the fan blade away from the fan 210. The fan 210 may be powered by any source, such as a motor powered by the battery of the vehicle 200, by power generated from the engine of the vehicle 200, by internal battery or other power source, solar power, fuel cell, etc. The fan 210 may also include a shroud or the like to minimize any safety risk associated with the rotating blade and/or to further channel or direct air into lower pressure region 106. A shroud may also improve the aesthetic qualities of the fan 210.

The fan 210 may be attached to the vehicle 200 in any way, such as a permanent mounting, temporary mounting, welding, bolting, magnets, glue, etc. The fan 210 may desirably be mounted to the rear surface 204, facing generally away from the rear surface 204. In an alternative embodiment, the fan 210 may be attached to the top surface 202, side surfaces 208, bottom surface 206, bumper 214, to a spare tire, spoiler, etc., as long as the fan 210 is able to potentially direct air towards lower pressure region 106.

In one embodiment, the fan 210 is positioned to direct air towards the center of the lower pressure region 106. The center, or pinnacle, of the lower pressure region 106 may serve as a rough approximation of the most effective location in which to direct air from the fan 210. The fan 210 may be located flush with a vehicle surface, such as the rear surface 204, or may alternatively be located at enough distance so that ducting may be attached to the fan 210. Any distance between the fan 210 and vehicle may be used, though the fan 210 is desirably near the rear surface 204 so as to maximize the effect of directed air. If the fan 210 is used without ducting, the fan 210 may desirably located in a location with sufficient ambient air for adequate operation of the fan 210.

In another alternative embodiment, the fan 210 may be mounted within the bumper 214 so as to provide a lower profile alternative. In this embodiment, the fan blade and inlet may be mounted within the bumper 214, hiding them from view and reducing the chances of an injury from the fan blades, while the fan outlet (if any) would be pointing away (either behind the vehicle, upwards, or another direction) from the bumper 214. The fan outlet could also be within the bumper 214.

The fan 210 may also have the ability to direct air in any direction. In one embodiment, the fan 210 is able to pivot to point in a variety of directions. If the fan 210 has an outlet, the outlet may pivot instead in order to provide the ability for the fan 210 to direct air in different directions. This may be useful, for example, in conjunction with a control strategy that optimizes fan direction based on vehicle speed, sensed regions of lower pressure, etc. In one embodiment, the fan 210 is directed towards the center of the lower pressure area 106 in order to maximize the effect of the fan 210. In alternative embodiments, the fan 210 may be pointed in any direction that will direct air into the lower pressure area 106 and serve to increase the pressure.

The optimal location or locations to direct air within the lower pressure region 106 depends on a variety of factors. As a vehicle accelerates, for example, the center of the lower pressure region 106 moves backwards. A vehicle 200 navigating a curve or subjected to a crosswind might have an offset lower pressure region 106, and the fan 210 that can be directed towards either side of the vehicle 200 may offer improved performance. The fan 210 with the ability to pivot in different directions provides many options to optimize performance under any conditions.

The fan 210 may also have the ability to have different rotational speeds for the fan blade. The fan 210 may have a pre-defined fixed speed, a user-configurable fixed speed, a controllable speed, etc. In one embodiment, a driver or passenger could choose different speeds for the fan 210, such as by a switch located in the cabin. In another embodiment, a controller (such as a microprocessor-based controller) may control the fan speed based on any type of input, such as vehicle speed, sensed air pressure, fan performance, etc. In yet another embodiment, the physical configuration of the fan 210, such as fan blade angle of attack, may be changed in order to optimize or improve performance.

The fan 210 may be composed of any materials. It is desired that the fan 210 be made of a durable, inexpensive, lightweight, rustproof, etc. An optional fan cover (not shown) may also be included to cover the fan 210 when not in use. In particular, the fan cover could advantageously be deployed or retracted depending on whether the fan 210 is in use or not.

In FIGS. 2–4, two air ducts 212 are attached to the top surface 202 of the vehicle 200. Each air duct 212 includes an inlet 222, a body 220, and an outlet 224. Air is brought into the duct 212 through the inlet 222 and transported to the outlet 224 via the body 220. In one embodiment, the air duct inlet 222 is substantially perpendicular to the flow of air when the vehicle 200 is moving forward so as to minimize additional drag created by the air duct 212. The air duct outlet 224 may be attached to (and in fluid communication with) the inlet of the fan 210 so as to facilitate the smooth transition of air from the air duct 212 to the fan 210. A filter to trap particulates or other objects may optionally be included within the air duct 212. The air ducts 212 may be attached to the vehicle 200 in any way, such as by bolts, magnets, welding, glue, rope, etc., or any method or system that is stable and secure at the maximum speed of the vehicle 200. Air ducts 212 may be integral to the body of the motor vehicle 212 and built into the sheet metal or other material, or may be added at a later time.

The use of the fan 210 to control airflow entering the lower pressure region 106 may be controlled automatically, by a user, by optimized control algorithms, etc. In one embodiment, the fan is turned on when a certain condition is reached. For example, the fan could turn on at a certain velocity (such as from the speedometer) or a certain pressure (as provided from a pressure sensor that would measure the pressure of the lower pressure region 106). A velocity-based trigger may be useful as the fan 210 will be potentially more effective at higher speeds, as the pressure drag generally increases with velocity. Similarly, a pressure-based trigger allows for the fan 210 to be used only when the benefit of the fan 210 outweighs the extra drag and power associated with operation of the fan 210 and duct 212 system. In another embodiment, a person in the vehicle 200 may turn any fans 210 on or off or control any other aspect of the fans 210 via a user control, such as a switch.

It is believed that the coefficient of drag may be reduced by five to ten percent utilizing one or more fans 210 to direct airflow into the lower pressure region 106. The exact reduction in coefficient of drag will depend on many factors, including the number and type of fans, shape of the vehicle, vehicle speed, etc.

Other aspects of the pressure drag reduction system 230 may also be controlled or optimized. In one embodiment, the aspects of the fan 210 such as fan speed or the fan blade angle may be changed to optimize performance. In another embodiment, the airflow through the ducts 212 may be controlled (such as moving ducts or interior surfaces) to provide an optimal amount of air to the fan 210. Optimization may include any aspects of the pressure drag reduction system 230, including fan speed, fan size, fan direction, fan blade angle of attack, duct configuration, number of fans turned on, duct configuration, etc. Optimization may be taken into account during initial design or construction, and is advantageously performed during operation. Optimization or any controls during operation may be controlled by an on-board controller, vehicle computer/control system, remote control, controls within the vehicle 200 cabin, etc.

One control example may be based on vehicle speed. While the vehicle 200 is moving at a slow speed (such as stuck in traffic or in the city), the lower pressure region 106 may be relatively small, and the power cost, complication, noise, etc. of the fan 210 may outweigh the benefits of running the fan 210. But as the motor vehicle 200 gets on the highway, the size and pressure differential of the lower pressure region 106 increases, making the ability of the fan 210 to direct air into the lower pressure region 106 more advantageous. In this embodiment, a typical vehicle speed may be calculated and the fan 210 may advantageously be turned on when the vehicle reaches that speed.

In another example, a pressure sensor could be located so as to sense a pressure indicative of the pressure of the lower pressure region 106. In this embodiment, when the pressure in the lower pressure region 106 falls below a certain pressure (such as when the vehicle 200 accelerates), one or more fans such as the fan 210 could be turned on. In this way, the fans need only be turned on when there is a benefit to doing so. Alternatively, the number of fans or the particular configuration of fans (when there are two or more fans like fan 210) may also be optimized based on the sensed pressure. In an alternative embodiment, a similar control scheme could be based on a pressure differential between the lower pressure region 106 and ambient air pressure, pressure from the front of the vehicle 200, a speed of a crosswind, a radius or angle of a curve on which vehicle 200 is traveling, and/or any other measurement indicative of the characteristics of the lower pressure region 106.

FIG. 5 depicts a rear view of a vehicle equipped with a pressure drag reduction system 530 according to an alternative embodiment. As shown in FIG. 5, vehicle 200 has two fans 510 for directing air behind the vehicle. In one embodiment, each fan 510 has a separate fan inlet and receives air from the outlet 524 of the corresponding air duct 212. In another embodiment, the two fans 510 share a fan inlet, and air from the outlets 524 of both air ducts 212 enters the joint fan inlet for use in the two fans 510. In an alternative embodiment, more than two fans 510 may be used to direct air behind the vehicle 200. For example, a series of smaller fans 510 could provide advantages in system power consumption, effectiveness, noise, aesthetics, cost, redundancy, etc. A larger number of fans 510 could also provide finer control over the amount of air being blown through each fan 510. Any combination of number, size, outlet direction, type, material, speed, or other design considerations for the fans 510 may be used and be within the scope of the invention.

FIGS. 6–8 depict a rear, top, and side view, respectively, of a vehicle equipped with a pressure drag reduction system 630 including a fan, side ducts and top ducts according to an alternative embodiment. The vehicle 200 of FIGS. 6–8 includes both top air ducts 212 and side air ducts 602. Both the top air ducts 212 and side air ducts 602 may feed into the inlet of fan 210. By utilizing both top and side air ducts, each duct may be sized to smaller dimensions, which may result in lower drag created by the ducts themselves as well as an improved aesthetic effect. Side air ducts 602 may be attached to the side surface 208 in any way and may extend any distance along side surface 208. In an alternative embodiment, top air ducts 212 and side air ducts 602 merge before reaching the fan 210 so that fewer ducts need to interface with the inlet of fan 210. Any combination of ducts may be utilized, including combinations of top, side, bottom, and internal ducts.

Figure 9:
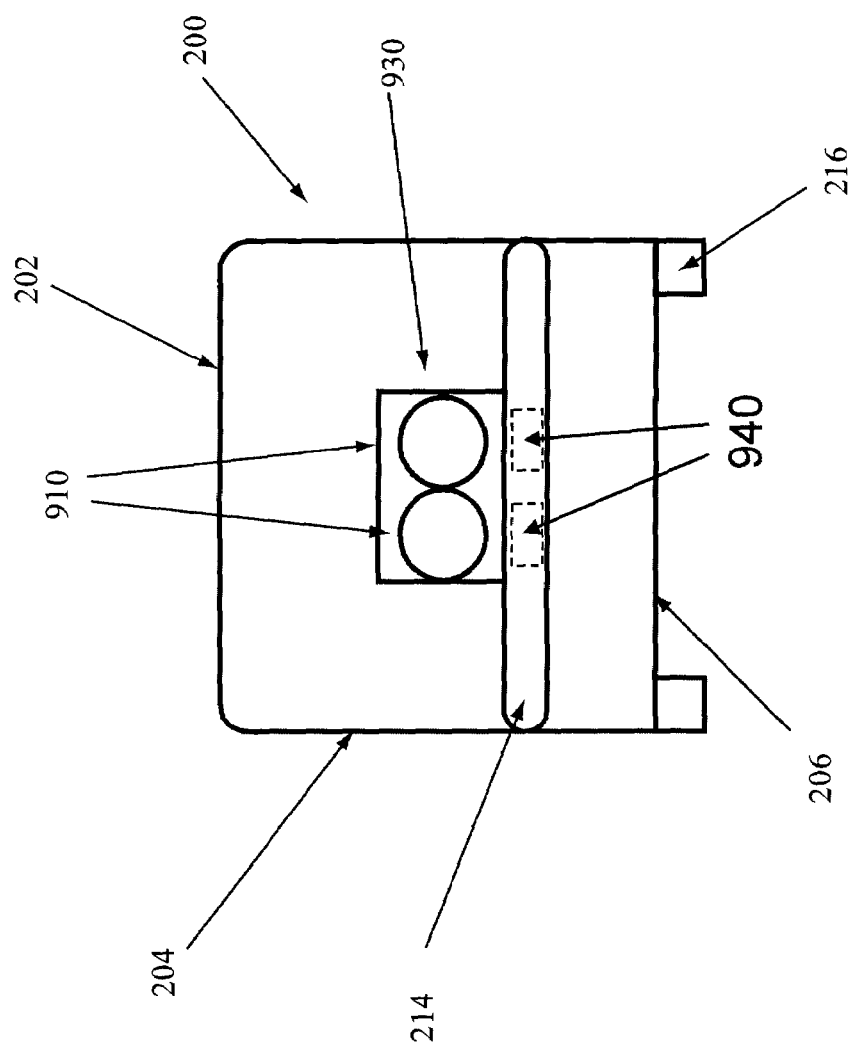
FIG. 9 depicts a rear view of a vehicle equipped with fans according to an alternative embodiment.

FIG. 9 depicts a rear view of a vehicle equipped with pressure drag reduction system 930 including two fans and no ducts according to another alternative embodiment. In this embodiment, fans 910 draw air from the space between the fans 910 and the rear surface 204 of the vehicle 200. Air may be located adjacent the rear surface 204 even when the lower pressure region 106 exists behind the vehicle 200. In this embodiment, fan speed is preferably limited so as to minimize over-rotation of the fan blade in the event that insufficient air is present, as over-rotation could result in burnout of the motor of the fans 910.

In an alternative embodiment, air is transferred to the inlet of the fans 910 via internal ducting instead of external ducts. In this embodiment, an air inlet could be located on, for example, the front surface 218 of the vehicle. Air could be ducted from the inlet to the inlet of the fans 910 via internal ducts 940, ducts that may be much less obtrusive than external ducts. Internal ducts 940 may also have reduced drag when compared to external ducts, as they do not add additional area to create drag. In one embodiment, air may be ducted from a radiator near the front surface 218 or any other source of air from within the vehicle 200.

In another alternative embodiment, a vehicle 200 may use internal ducts 940 to deliver air to one or more fans 910 utilizing the bumper 214. In this embodiment, internal space within the bumper 214 may be used to contain the internal ducts 940 and/or the inlets of the fans 910. This embodiment may provide structural and/or aesthetic advantages, as the fan/duct interface may be hidden within the bumper 214.

In another alternative embodiment, one or more fans 910 may be located within any of the ducts 212, whether external or internal. This may provide the benefits of reducing any drag associated with the fans as well as minimizing any safety risk. In this embodiment, the air duct outlet 224 may serve as the outlet for the fans 910. The fans 910 in this embodiment must be small enough to fit within the duct 212, limiting the physical size of each of the fans 910.

The method and apparatus for reducing pressure drag of a vehicle disclosed herein may be provided as part of a vehicle when manufactured, bought or leased. In this embodiment, the pressure drag reduction system, such as pressure drag reduction system 230, including fans and/or ducts, may be provided as an option for the vehicle 200. This may allow the fan and/or ducts to be more fully integrated into the vehicle 200, such as by using internal ducts, integrating the ducts or fans with body work, matching colors and materials, etc. Alternatively, any fans may be designed to appear as a bumper guard (such as a black or chrome bumper guard) in order to provide a more "rugged" appearance. Integration with the vehicle 200 is a particularly attractive option for manufacturers of SUVs, trucks, vans, tractor-trailer rigs, or other high-Cd vehicles, where fuel efficiency is increasingly desired (and where the benefits of reducing pressure behind the vehicle are greater) and any aesthetic disadvantage may be reduced.

In another embodiment, the pressure drag reduction system 230 may be provided as a retrofit system. In this case, for example, a vehicle owner could purchase pressure drag reduction system 230 in order to improve the fuel efficiency of their vehicle 200. An easily attachable/detachable pressure drag reduction system 230 may be particularly attractive to a rental agency, who could rent them to drivers who are, say, about to embark on a cross-country trip and want to improve their vehicle's fuel efficiency. For a retrofit system, it may be desirable to provide an independent power source, such as a battery, small fuel cell, solar cells, etc., but the vehicle 200 power source may also be used.

As will be recognized, the pressure drag reduction system 230 may add complexity, cost, weight, and drag to a vehicle 200, resulting in a higher upfront cost and a weight/drag penalty. The operation of the pressure drag reduction system 230, however, will serve to reduce operating costs of the vehicle 200 dramatically by overcoming the added weight and drag associated with the system by reducing the pressure drag of the vehicle 200.

Figure 10:
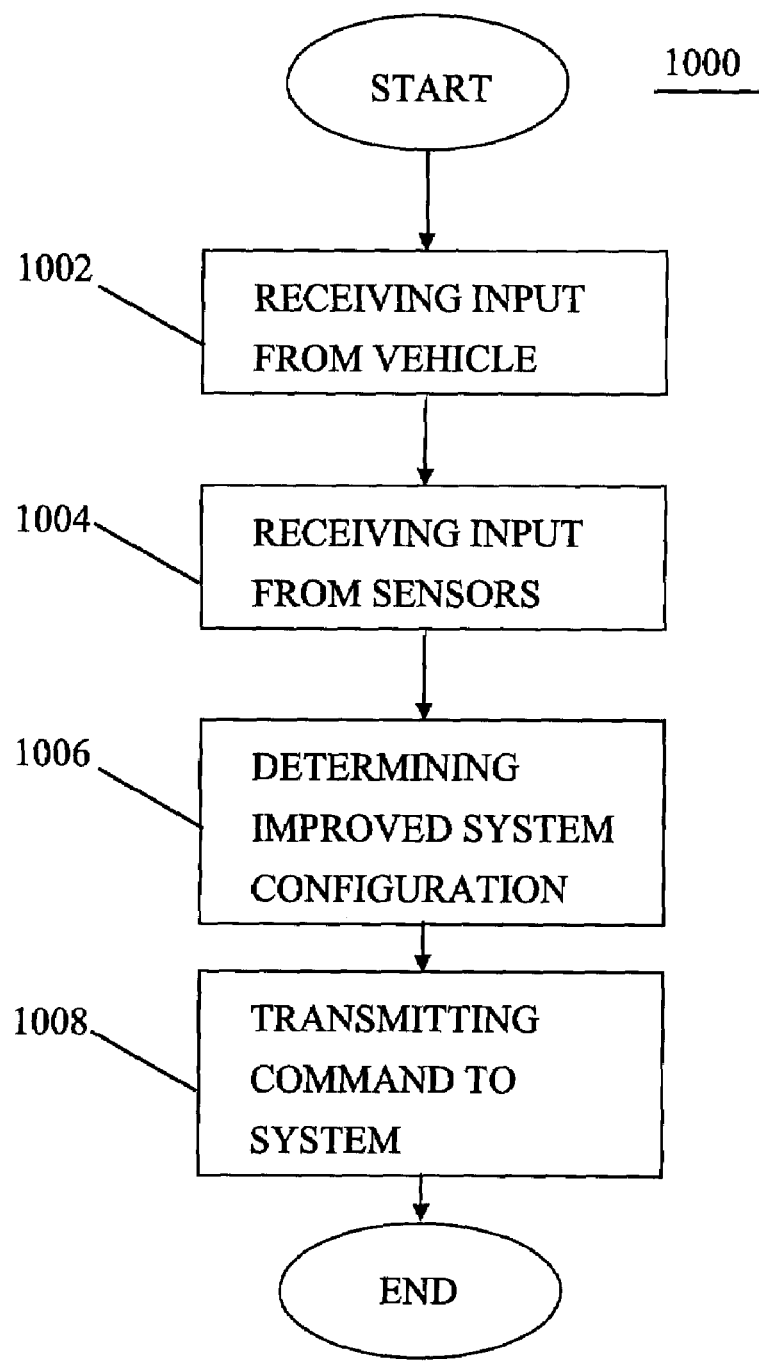
FIG. 10 depicts a flowchart for optimizing the pressure drag reduction system according to one embodiment.

FIG. 10 depicts a flowchart 1000 for optimizing the pressure drag reduction system 230 of a vehicle 200 according to one embodiment. The method of FIG. 10 may be implemented by any type, or combinations of type, of processor, such as hardware, software, firmware, etc. Flowchart 1000 begins with optional step 1002, receiving input from the vehicle 200. If input is received from the vehicle 200, it may include vehicle speed, time of day, pressures from different locations on the vehicle, environmental conditions, vehicle angle (e.g., such as tilt during a turn), duct configuration, air velocity from different locations near the vehicle, vehicle type or configuration, ambient noise level, etc. Input from the vehicle could also include user inputs such as power on commands, power off commands, requests for fan speed or fan configuration, pre-defined profiles (e.g., a profile optimized for low noise or city driving, etc.), or any other type of information.

Flowchart 1000 continues in optional step 1004, receiving input from sensors. The input from sensors may include any type of information discussed in relation to step 1002, as well as information derived from sensors related to the pressure drag reduction system 230, such as fan speed, fan blade angle of attack, fan direction, pressure, duct configuration, noise level, or any other type of information.

Flowchart 1000 continues in step 1006, determining an improved pressure drag reduction system 230 configuration. In this step, an improved or optimized configuration is determined based on the inputs received in step 1002 and/or step 1004. The improved or optimized configuration may include turning fans on or off, changing the direction of fans, changing the speed or blade angle of attack for fans, changing the duct configuration, or any other aspect or output characteristic of the system. A determination may be made by calculations, algorithms, look-up tables, or any other means. As one example, a decision to turn on a fan 210 may be made in step 1006 if a vehicle speed over a predefined amount is received as an input in step 1002.

The flowchart 1000 then proceeds to step 1008, transmitting a command based on the determined improved system configuration to the pressure drag reduction system 230. The flowchart may then terminate, or redirect to step 1002 for repeated improvement or optimization cycles.

Unless the context clearly requires otherwise, throughout the description and the claims, words using the singular or plural number also include the plural or singular number, respectively. Additionally, the words "herein," "hereunder," "above," "below," and words of similar import, when used in this application, shall refer to this application as a whole and not to any particular portion. While certain aspects of the invention are presented below in certain claim forms, the inventors contemplate the various aspects of the invention in any number of claim forms. Accordingly, the inventors reserve the right to add additional claims after filing the application.

What is claimed is:

1. A method for reducing the pressure drag of a vehicle, the method comprising:
   capturing air from the airflow around the vehicle when the vehicle is moving;
   directing the captured air through one or more internal ducts through a rear bumper of the vehicle to one or more fans; and
   directing the captured air with the one or more fans into a lower pressure region to reduce pressure drag associated with movement of the vehicle, wherein the lower pressure region is created behind the vehicle in response to forward movement of the vehicle.

2. The method of claim 1, wherein directing the captured air through one or more internal ducts comprises directing the air through a duct integrated within the vehicle.

3. The method of claim 1, wherein directing the captured air through one or more internal ducts comprises directing the air through two or more ducts.

4. The method of claim 1, wherein directing the captured air with the one or more fans into the lower pressure region comprises controlling the one or more fans based on one or more of a vehicle speed or a pressure in the lower pressure region.

5. The method of claim 1, wherein directing the captured air with the one or more fans into the lower pressure region comprises pivoting the fan.

6. The method of claim 1, wherein directing the captured air with the one or more fans into the lower pressure region comprises redirecting the air to compensate for movement of the lower pressure region relative to the vehicle.

7. The method of claim 6, wherein redirecting the air comprises compensating for a crosswind.

8. The method of claim 6, wherein redirecting the air comprises compensating for a turn being conducted by the vehicle.

9. The method of claim 1, wherein directing the captured air with the one or more fans into the lower pressure region comprises directing the air received from the one or more ducts towards a center of the lower pressure region.

* * * * *